(12) United States Patent
Feder et al.

(10) Patent No.: US 7,082,472 B1
(45) Date of Patent: Jul. 25, 2006

(54) METHOD FOR TRANSMITTING DATA OVER A NETWORK MEDIUM

(75) Inventors: Peretz Moshes Feder, Englewood, NJ (US); Chih-Peng Li, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 981 days.

(21) Appl. No.: 09/652,153

(22) Filed: Aug. 31, 2000

(51) Int. Cl.
*G06F 15/16* (2006.01)

(52) U.S. Cl. ............... 709/235; 370/280; 370/445; 370/448; 370/235

(58) Field of Classification Search ............... 370/280, 370/442, 446, 448, 338, 458, 235; 709/232
See application file for complete search history.

(56) References Cited

U.S. PATENT DOCUMENTS

| | | | | |
|---|---|---|---|---|
| 5,699,515 A | * | 12/1997 | Berkema et al. ............ | 370/448 |
| RE36,353 E | * | 10/1999 | Yang et al. ................. | 370/448 |
| 6,078,591 A | * | 6/2000 | Kalkunte et al. ........... | 370/448 |
| 6,172,983 B1 | * | 1/2001 | Shaffer et al. ............. | 370/446 |
| 6,215,792 B1 | * | 4/2001 | Abi-Nassif .................. | 370/458 |
| 6,285,662 B1 | * | 9/2001 | Watanabe et al. .......... | 370/280 |
| 6,529,520 B1 | * | 3/2003 | Lee et al. ................... | 370/442 |
| 6,614,799 B1 | * | 9/2003 | Gummalla et al. ......... | 370/448 |
| 6,721,331 B1 | * | 4/2004 | Agrawal et al. ............ | 370/448 |
| 6,813,260 B1 | * | 11/2004 | Fogle ......................... | 370/338 |
| 6,819,676 B1 | * | 11/2004 | Min ............................ | 370/448 |

* cited by examiner

*Primary Examiner*—John Follansbee
*Assistant Examiner*—Dustin Nguyen

(57) ABSTRACT

Disclosed is a method to reduce contention in a networked system and to provide superior bandwidth allocation to network devices contesting for network use. The method achieves reduced contention by reducing the amount of delay a network device is required to wait before attempting to transmit data after a data collision occurred. Superior bandwidth allocation is achieved by placing devices in back-off delay immediately after they transmit successfully.

12 Claims, 2 Drawing Sheets

METHOD FOR TRANSMITTING DATA OVER A NETWORK MEDIUM

BACKGROUND OF THE INVENTION

1. Field of the Invention

The present invention relates to Medium Access Control (MAC) sublayer protocols for network interfaced systems, and more particularly, to network systems requiring collision resolution mediation.

2. Present State of the Art

In any network in which multiple hosts are connected to a fixed single shared communications channel, there must be a method to resolve which host obtains use of a channel when there is contention. In a single shared communications channel system, data sent by one host will be received by all other hosts. However, if two different hosts attempt to transmit data simultaneously, there is a collision, and the data is lost. The various methods to resolve contests between the hosts and for recovering from collisions are called Medium Access Control (MAC) sublayer protocols.

Protocols in which multiple hosts listen for a carrier (i.e. a transmission) to determine whether the channel is currently busy are called Carrier Sense Multiple Access (CSMA) protocols. By waiting until the channel is free to begin transmitting, some collisions are avoided. Many industry standards use CSMA protocols, the most popular standard being Ethernet, which uses a CSMA/CD protocol (CD standing for Collision Detection).

The CSMA/CD protocol works as follows: a station designed to transmit senses a medium. If the medium is busy (i.e. some other station is transmitting) then the station defers its transmission to a later time. If the medium is sensed free then the station is allowed to transmit. This is very effective when the medium is not heavily loaded, since it allows stations to transmit with minimum delay. But there is always a chance of multiple stations simultaneously sensing the medium as being free and transmitting at the same time, causing a collision. The collision is detected by the stations transmitting since they listen to the medium while they transmit to ensure that they are the only station transmitting at that time. If the stations hear their own transmission returning in a garbled form, as would happen if some other station had begun to transmit its own message at the same time, then they know that a collision occurred.

In the Ethernet case, if such a collision is recognized by the transmitting station, then it enters into a retransmission phase based on an exponential random back-off algorithm. This exponential random back-off algorithm is a method used to dynamically adapt to the number of transmitting stations trying to send data to thereby reduce an overall number of collisions. Essentially, the exponential random back-off algorithm helps to prevent multiple stations from attempting to retransmit simultaneously at predetermined transmission delay intervals. The exponential random back-off algorithm achieves this by using a pseudorandom delay mechanism to enforce a collision back-off interval before retransmissions occur (discussed hereinafter as BEB).

Another protocol using the MAC layer is the 802.11 LAN standard, which is based on a cellular architecture where the system is subdivided into cells. Each cell (called Basic Service Set, or BSS, in 802.11 nomenclature) is controlled by a Base Station (called Access Point or, in short AP). Much like Ethernet, the 802.11 LAN standard relies upon a protocol to ensure that collisions occur infrequently.

The Institute of Electrical and Electronics Engineers (IEEE) has produced several standards for MAC protocols. IEEE standard 802.3 has been universally adopted for the CSMA/CD protocol. In the 802.3 standard, each host that has data to transmit waits until it detects an idle channel, and then begins transmitting.

The 802.3 standard uses the Binary Exponential Backoff (BEB) method to dynamically adapt to the number of hosts trying to send, thereby effectively reducing the probability of a collision. If a host detects collision, it waits a random integer number of "slot times" before repeating the cycle. A slot time represents the minimum period of time that a transmitting station needs access to a medium to send a smallest legal packet size. In the standard, a slot time is defined as the time required to transmit 512 bits over the network and is based upon the maximum distance between any two stations on a network. This value is determined by the worst case round trip propagation delay between hosts allowed by standard 802.3 for 10 Mbps networks, and has been preserved in the new standard for 100 Mbps networks.

If two different hosts pick up the same random number of slot times, a collision will occur. The maximum random number increases as the number of collisions increases. In the BEB method, the random number is between zero and $2^{min(n, 10)} - 1$, where the counter n is the number of collisions experienced by a packet. Therefore, after the first collision, the host waits zero or one slot time. After the second collision, the host waits zero, one, two or three slot times. However, after ten collisions, the maximum random number is frozen at 1023. In addition, after 16 collisions, a controller reports a failure back to the host. Following the successful transmission, the counter n in the successful host is reset to zero.

The MAC sublayer protocol currently used can cause significant performance problems. Since collisions waste channel bandwidth, it is vital that the number of collisions be minimized to decrease the load on the channel. In addition, collisions can generate more collisions through positive feedback when the retransmitted packets compete with later arrivals. In other words, positive feedback occurs when transmitted packets collide and at a later time compete to retransmit with new stations contending for channel availability. This phenomenon tends to heavily load the channel with time. A protocol may be described as stable if it avoids the positive feedback effect. Unfortunately, it is not clear whether the BEB method is stable.

Even if the BEB method is stable, the dynamics represent a poor scheduling discipline. The BEB method results in a reverse lottery in which certain packets are selected for exceptionally long delays, while most other packets are transmitted as soon as they reach the head of the transmit queue.

It is important to distinguish the perceptions of the service provider from the user. The primary concern of the service provider is throughput; whenever there is data in the system in need of transmission, the network should be engaged in delivering it. The users, on the other hand, are primarily concerned with delay. Delay consists both of waiting time, the time that elapses from generation of a data packet to its arrival at the head of the transmit queue, and access time, the time that a data packet spends at the head of the transmit queue. Human users have a strong dislike for unpredictability. In many applications, such as a voice or video, delay variance is as important as the average delay.

With BEB, the collision counter (equal to the number n above) of a given host is updated only in response to actual transmission attempts by the host. Consider several active hosts each with several data packets in queue. Once there is a successful packet transmission, only the "winner" will reset its collision counter to zero. First, the winning host is free to transmit its next packet immediately, while other hosts may have a retry time that is longer than the transmission packet time. Second, at the next collision, the winner randomly selects its retry time from the smallest possible interval, whereas other hosts are randomized in retry times of a much larger interval. Therefore, the first winning host is likely to capture the network repeatedly until its transmit queue is empty. This is called the "capture effect." Those hosts which have transmitted recently are about one-hundred times more likely to acquire the channel than others. This "last in, first out" system results in unacceptable variations in the delay time.

Modifications to BEB have been proposed in order to eliminate the unfairness of the capture effect in the standard protocol, but their effectiveness has been found to be limited.

SUMMARY OF THE INVENTION

According to the method of the present invention, networked devices experiencing multiple collisions are required to wait a back-off delay window, where if multiple delay periods are required a subsequently obtained back-off delay window is less than two times a preceding back-off delay window. Therefore, networked devices that have experienced multiple collisions are not forced to wait delay periods as great as those experienced in systems using BEB. In order to reduce the capture effect, those network devices that achieve a successful transmission are immediately placed in back-off delay. Therefore, other devices contending for the medium may transmit without having to wait a prolonged delay period.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF PREFERRED EMBODIMENTS

Figure 1:
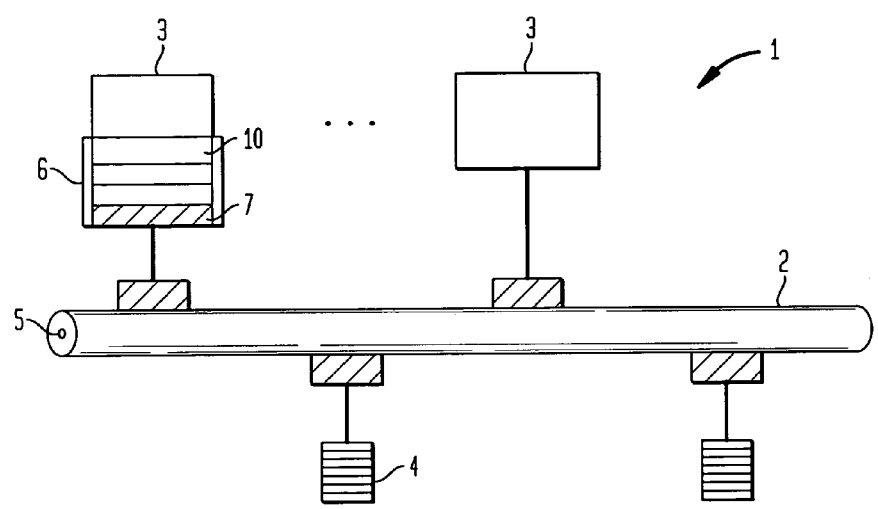
FIG. 1 is a schematic illustration of a network communication network.

As depicted in FIG. 1, a network 1 includes a communication medium 2, which is shared by a plurality of devices which interface the communication medium 2. The possible devices may include computers 3, file servers 4, and other such devices. Shown here, the communication medium 2 is a coaxial cable 5 commonly used for Ethernet networks; however, the present invention is not limited to Ethernet networks. For example, the present invention may be applied to any network that uses CSMA protocols. For example, wireless systems, which rely on collision resolution to ensure effective transmission of packet data.

Each device using the communication medium 2 will have a transmission queue 6 for holding data packets 10 that the device needs to transmit. For example, as seen in FIG. 1, the computer 3 has an earliest packet 7 placed in the queue 6. This packet 7 will be the first transmitted once the communication medium 2 is available to the computer 3.

In terms of Ethernet, and also relating to wireless systems, when the packet 7 arrives at the head of the queue 6, the packet 7 controlled by the computer 3 has to reserve the communication medium 2 bandwidth through reservation slots (see discussion of slot times hereinabove). The computer 3 reserves communication medium 2 bandwidth by obtaining a reservation to transmit the packet 7 through a reservation slot. A reservation is obtained when the computer 3 senses that the communication medium 2 is quiet (Carrier Sense) after a prior reservation slot expires. Once the packet 7 has a reservation (the medium 2 is idle) for a reservation slot for transmission, the packet 7 attempts to transmit. If the packet 7 transmits through the reservation slot successfully, the packet 7 will be transmitted without contention. However, packets collide in the reservation slot, each individual packet has to "back-off" and wait a random period of time for retransmission. The back-off algorithm currently used is BEB, and therefore, the capture effect often occurs. Control of transmission and obtaining reservation slots are accomplished thorough the computer 3

Figure 2:
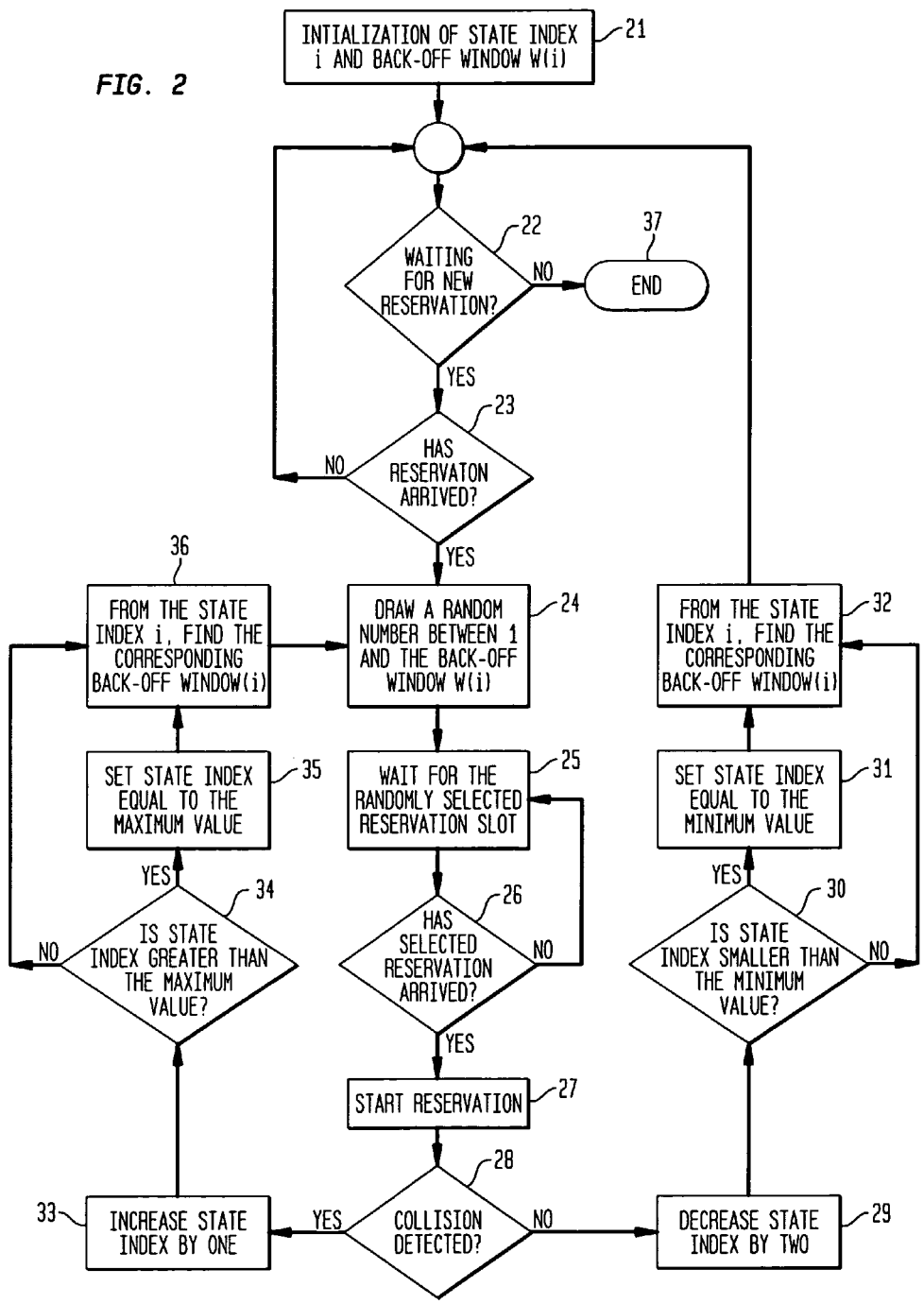
FIG. 2 is a flow diagram illustrating the method according to the present invention.

FIG. 2 is a flow diagram summarizing a method according to the present invention for a network node (i.e. computer 3) for accessing the communication medium 2 of the network 1. However, as was previously described, the use of the computer 3 to describe the method of the present invention is intended to be merely illustrative, and should not be construed as limiting the scope of the present invention.

Referring to the FIGS. 1 and 2, in Step 21, the computer 3 initializes a State Index i and a Back-off Window W(i), for the packet 7 in queue 6. The State Index i is an incrementable or decrementable variable that represents the total number of times a reservation has been transmitted unsuccessfully and/or the number of times a previous data packet was transmitted unsuccessfully, but decreased by some predetermined amount (discussed in detail hereinafter). As such, the State Index i is a function of a number of unsuccessful transmissions a prior or current packet has undergone. The State Index i is initialized as an integer value greater than 1. The Back-off Window W(i) is an integer value which is directly correlated with the State Index i. For example, when the State Index i is initialized, for example as 1, then the Back-off Window W(i) will be initialized as 2. In one embodiment of the present invention the initialization is done using Back-off Window $W(i)=2^{(ceil(i/2))}$, where ceil (x) is the smallest integer that is greater or equal to x. Therefore, for a State Index i=1, i/2=0.5, thereby the function ceil(0.5)=1. However, other methods for calculating the Back-off Window W(i) are also within the scope of the present invention and will be discussed hereinafter. It is preferable to initialize the State Index i and the Back-off Window W(i) as 1 and 2, respectively, but other integer values of i, therefore also other values of the Back-off Window W(i), may alternatively be used.

In Step 22, the computer 3 begins to wait for a reservation (access to the medium) for the packet 7. Note that at Step 22 a determination may be made to halt processing by proceeding to Step 37. If a reservation is desired, the computer 3 continues to wait for the reservation until one arrives, Step 23. Once the reservation arrives, the processing of Step 24 occurs. In Step 24, the computer 3 randomly selects a number between 1 and the Back-off Window W(i) integer value. For example, if the Back-off Window W(i) is an integer value of 2, then the random selection will be either 1 or 2. This randomly selected number represents a particular reservation slot the reservation of Step 23 is to use. As discussed, a reservation slot is typically defined as the amount of time required to transmit 512 bits over any given network. However, the reservation slot according to the present invention is not limited to this time value.

Next, in Step 25 the computer 3 will wait for the reservation slot, which was randomly selected in Step 24. Once the reservation slot has arrived, in Step 27 the reservation of Step 23 starts. Specifically, packet 7 enters the communication medium 2. Next, Step 28 determines if a collision has occurred. A collision occurs when a plurality of devices pick the same randomly selected reservation slot, thereby causing packet data to collide. If a collision did not occur, then the method according to the present invention proceeds to Step 29.

In Step 29, the State Index i is decreased by 2. Therefore, if the State Index i was initialized 1, as it was in Step 21, then the instant value of the State Index i after being decreased by 2 is −1. Step 30 then determines if the value of the State Index i is less than a predetermined minimum value for the State Index i. The minimum value for The State Index i is the initialized value of Step 21. However, the minimum value may be set higher or lower if it is desired, but should be maintained as a positive integer value. If the State Index i is less than the minimum value, then in Step 31 the State Index i is set equal to the minimum value, and in Step 32 the Back-off Window W(i) is found based on the minimum value (see Step 21 for calculating W(i)). The State Index i is therefore set to the value the State Index i was initialized as in Step 21.

Alternatively, the Back-off Window W(i) may be calculated using the following functions. If the State Index i is an odd integer then the Back-off Window W(i) may be calculated using Back-off Window $W(i)=2^{((i+1)/2)}$; however, if the State Index i is even then the Back-off Window $W(i)=2^{(i/2)}$. These two functions should be used together to calculate a range of back-off windows for a range of odd and even state index values. Shown in TABLE I are corresponding back-off windows for a range of state index values from 1–20, where the back-off windows were calculated using the Back-off Window formulas hereinabove. As is seen in the Table, the back-off windows increase in value after two increments of the State Index i. Therefore, according to the present invention, the back-off windows do not increase in the conventional exponential manner. The back-off windows shown in TABLE 1 also correspond to those obtainable using Back-off Window $W(i)=2^{(ceil(i/2))}$.

Returning to the flow diagram shown in FIG. 2, if Step 30 determines the State Index i is greater than the minimum value, then Step 32 is processed immediately. Specifically, the State Index i is maintained, and the corresponding Back-off Window W(i) is calculated based upon the maintained State Index i. Calculation of the Back-off Window W(i) may be accomplished using the formulas discussed hereinabove (e.g. dynamically). Alternatively, the Back-off Window W(i) may also be determined from a look-up table stored in a memory module in the computer 3. Such a look-up table would contain back-off windows determinable using as a reference value the state indexes. Such a look-up table may resemble TABLES I or II shown hereinabove; however, the present invention is not limited to the values contained in these tables. Once Step 32 has been processed, the method according to the present invention returns to processing Step 22, where it is again determined if a new reservation is desired.

On the other hand, if in Step 28 a collision is detected, then processing moves to Step 33. In Step 33, the State Index i is increased by 1. Next, in Step 34 the State Index i is compared against a maximum value thereof. According to the present invention, the Back-off Window W(i) should not exceed 1024, as allowing a Back-off Window W(i) of greater than 1024 would force the computer 3 to endure unacceptable network delays. However, the Back-off Window W(i) may be other integer values less than or greater than 1024. Nonetheless, if the maximum value is based upon the State Index i value which will provide a maximum Back-off Window W(i) of 1024, then according to the values shown in TABLE I, the maximum value of the State Index i will be 20, and according to the values shown in TABLE II, the maximum value of the State Index i will be 19.

If the State Index i is greater than the maximum value, then the processing moves to Step 35. In Step 35, the State

TABLE I

| i | 1 | 2 | 3 | 4 | 5 | 6 | 7 | 8 | 9 | 10 |
|---|---|---|---|---|---|---|---|---|---|----|
| Window (i) | 2 | 2 | 4 | 4 | 8 | 8 | 16 | 16 | 32 | 32 |
| i | 11 | 12 | 13 | 14 | 15 | 16 | 17 | 18 | 19 | 20 |
| Window (i) | 64 | 64 | 128 | 128 | 256 | 256 | 512 | 512 | 1024 | 1024 |

As an alternative to the above, calculating back-off windows may also be accomplished using the following functions. If the State Index i is odd then the Back-off Window W(i) may be calculated using $W(i)=2^{((i+1)/2)}$ (same as hereinabove). However, for even values of the State Index i the formula Back-off Window=$(2^{(i/2)}+2^{((i+2)/2)})/2$ is used. Shown in TABLE II are corresponding back-off windows for a range of state index values from 1–19, where the back-off windows were calculated using the Back-off Window formulas hereinabove. As seen in the table, according to the present invention, the back-off windows do not increase in the conventional exponential manner (e.g. using $2^i$).

Index i is set to the maximum value thererof. Next, in Step 36, based on the State Index i determined in Step 35, the Back-off Window W(i) is found. According the the discussion of the previous paragraph, a maximum State Index i=20 will provide a Back-off Window W(i) of 1024. Once the Back-off Window W(i) is determined, the processing returns to Step 24, and the Steps 24–28 are repeated.

If in the decision Step 34 the State Index i is less than the maximum value, then the processing moves directly to Step 36, where the State Index of Step 33 is used to find the Back-off Window W(i). Again, once the processing of Step 36 is complete, Steps 24–28 are repeated.

TABLE II

| i | 1 | 2 | 3 | 4 | 5 | 6 | 7 | 8 | 9 | 10 |
|---|---|---|---|---|---|---|---|---|---|----|
| Window (i) | 2 | 3 | 4 | 6 | 8 | 12 | 16 | 24 | 32 | 48 |
| i | 11 | 12 | 13 | 14 | 15 | 16 | 17 | 18 | 19 | |
| Window (i) | 64 | 96 | 128 | 192 | 256 | 384 | 512 | 768 | 1024 | |

The method described hereinabove is used, after initialization in Step 21, to send the packet 7 over the communication medium 2. The process of providing reservations for packets will repeat as long as the queue 6 contains packets.

The method described hereinabove may be implemented using software, hardware, digital and/or analog circuitry, etc. The apparatus implementing the method according to the present invention may be any one of, but not limited to: a computer, file server, printing device, wireless device, repeater, etc.

The apparatus and method according to the present invention provide a back-off algorithm, which is superior to BEB used by the standards. As discussed previously, BEB suffers from capture effect, where devices may dominate most of the available bandwidth. If this occurs, some of the reservations have very small delays, while other reservations have very large delays, which results in a large standard deviation of delay and an unfair allocation of available bandwidth. According to experimental results, the method of the present invention, when there are eight devices and a mean arrival time of 32 frames, the method of the present invention achieved a 40% improvement over the standard deviation of BEB. The advantages of the present invention are achieved by limiting the rate at which the back-off windows increase in size, and ensuring network devices do not capture the network medium through immediate back-off of newly initiated reservations.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of transmitting data over a medium, the method comprising the step of:
    obtaining a back-off delay window for retransmitting a data packet, the back-off delay window obtained being based upon a number of unsuccessful transmissions of the data packet or an initial delay value; and
    if the number of unsuccessful transmissions of the data packet or the initial delay value is an odd integer value, a formula for obtaining the back-off delay is $2^{((i+1)/2)}$, where i represents the number of unsuccessful transmissions of the data packet or the initial delay value.

2. The method according to claim 1, wherein the obtained back-off delay window is found using a lookup table, developed in part based on the formula.

3. The method according to claim 2, wherein the lookup table comprises back-off delay window values determinable based upon a number times a given data packet is unsuccessfully transmitted.

4. The method according to claim 1, wherein if the number of unsuccessful transmissions of the data packet or the initial delay value is an even integer value, a formula for obtaining the back-off delay is $(2^{(i/2)}+2^{((i+2)/2)})/2$, where i represents the number of unsuccessful transmissions of the data packet or the initial delay value.

5. The method of claim 1, wherein the obtained back-off delay window is equal to one of a preceding back-off delay window and a future back-off delay window.

6. The method according to claim 5, wherein the preceding back-off delay window is a back-off delay window which occurred immediately prior to the obtained back-off delay window.

7. The method according to claim 5, wherein the future back-off delay window is a back-off delay window which occurs immediately following the obtained back-off delay window.

8. The method according to claim 1, wherein if the number of unsuccessful transmissions of the data packet or the initial delay value is an even integer value, a formula for obtaining the back-off delay is $2^{(i/2)}$, where i represents the number of unsuccessful transmission of the data packet or the initial delay value.

9. The method according to claim 1, wherein if the obtained back-off delay window is less than a minimum back-off window, the obtained back-off delay window is set equal to a minimum back-off window.

10. The method according to claim 1, wherein the preceding back-off delay window is less than a maximum back-off delay window.

11. A method of transmitting data over a medium, the method comprising the step of:
    obtaining a back-off delay window for retransmitting a data packet, the back-off delay window obtained being based upon a number of unsuccessful transmissions of the data packet or an initial delay value, and
    if the number of unsuccessful transmissions of the data packet or the initial delay value is an even integer value, a formula for obtaining the back-off delay is $(2^{(i/2)}+2^{((i+2)/2)})/2$, where i represents the number of unsuccessful transmissions of the data packet or the initial delay value.

12. A method of transmitting data over a medium, the method comprising the step of:
    obtaining a back-off delay window for retransmitting a data packet, the back-off delay window obtained being based upon a number of unsuccessful transmissions of the data packet or an initial delay value, and
    if the number of unsuccessful transmissions of the data packet or the initial delay value is an even integer value, a formula for obtaining the back-off delay is $2^{(i/2)}$, where i represents the number of unsuccessful transmission of the data packet or the initial delay value.

* * * * *